United States Patent
Sano et al.

[11] 4,161,651
[45] Jul. 17, 1979

[54] SIMULTANEOUSLY SAMPLED REMOTE DATA READING AND TRANSMISSION SYSTEM USING OPTICAL FIBERS

[75] Inventors: Yoshihiro Sano; Tomio Chiba, both of Katsuta; Hiroyuki Kudou; Yoshiteru Miki, both of Hitachi, all of Japan

[73] Assignee: Hitachi, Ltd., Japan

[21] Appl. No.: 882,909

[22] Filed: Mar. 2, 1978

[30] Foreign Application Priority Data

Mar. 16, 1977 [JP] Japan .................. 52-27907

[51] Int. Cl.² .................... H04B 9/00; G01R 19/26
[52] U.S. Cl. ............................ 250/199; 324/96
[58] Field of Search ................ 250/199; 324/96, 97

[56] References Cited
U.S. PATENT DOCUMENTS

| | | | |
|---|---|---|---|
| 3,597,684 | 8/1971 | Damen | 324/96 |
| 3,621,390 | 11/1971 | VonWillisen | 324/96 |
| 3,679,974 | 7/1972 | Mollenbeck | 324/96 |
| 3,781,092 | 12/1973 | Sussman | 324/96 |
| 4,074,127 | 2/1978 | Mochida | 250/199 |
| 4,119,948 | 10/1978 | Ward | 250/199 |

*Primary Examiner*—Howard W. Britton
*Attorney, Agent, or Firm*—Craig and Antonelli

[57] ABSTRACT

A system for sampling and collecting simultaneously data from terminal apparatus installed at a plurality of data measuring locations (data sources) distributed in a system to be monitored or controlled by using at least a single optical fiber includes means for initiating sampling of measured quantities in response to a synchronizing signal supplied from a master station, and means for allotting to the terminal apparatus respective particular time slots during which the data as measured is transmitted to the master station through at least a single optical fiber.

8 Claims, 7 Drawing Figures

SIMULTANEOUSLY SAMPLED REMOTE DATA READING AND TRANSMISSION SYSTEM USING OPTICAL FIBERS

BACKGROUND OF THE INVENTION

1. Field of the Invention

The present invention relates to a remote data reading and transmission system suited to be used for collecting periodically data as sampled simultaneously by a plurality of data sources distributed in a system to be controlled, with the aid of a common optical fiber.

2. Description of the Prior Art

Among various types of information required for effecting control in an electric power system such as a power plant, essential elements will be information relative to an instantaneous value and an effective value of currents and voltages and ON-OFF state of circuit breakers. On the basis of such information, protection, regulation and other controls are made for the power system including a power station, substations, power transmission lines or the like equipments.

In a hitherto known control system for a power system, the information about currents and voltages has been derived in the form of analog quantities scaled down to the order of about 1 ampere and 100 volts. The derived information or data signals are collected, transmitted and processed individually in dependence on its utilization such as for protection of equipment, control of power supplies and demand, open and close operations of circuit breakers and line switches, and supervisory control.

FIG. 1 illustrates a hitherto known protective relaying system for a substation in a power system. The substation includes duplicated buses B1, B2, transformers T1, T2 and two power transmission lines L$_1$, L$_2$. In FIG. 1, the broken line represents a zone PA to be protected. Several circuit breakers CB1, ..., CB6 are installed in the boundary point of the protective zone. Current transformers CT1, ..., CT6 are installed in adjacency to the respective circuit breakers. Each of the current transformers is connected through individual wiring to the bus protective relaying system BPRD for protection of the buses B1 and B2. In other words, local information (current signals) obtained from the various current transformers is fed to the protective relaying system through the respective individual conductors. Further, since the information or data for protection of power transmission lines, buses, or transformers as well as information required for the purposes other than protection such as for control or regulations, various operations for maintenance or the like are supplied to a central control station through respective different conductors even in the case where some of the information is derived from the same measuring location, the number of such pieces of wiring or conductors for collecting the information will amount to a very large amount for the whole of the substation. Such a case is not shown in the drawings. Accordingly, if the existing individually separated wiring system is continued to be adopted for the transmission of various pieces of information in the power system which itself is going to be become much larger and more complicated, the information transmitting wiring will also become inevitably more complicated, thereby making the maintenance more difficult. Besides, a serious problem will arise in respect of available space for expansion of the power system.

In view of the situation described above, there has been a tendency to adopt digital techniques in control systems for power systems with a view to facilitating multiplex transmission of information. For example, it is possible transmit to data for three phases of a power transmission line to a central control on a time division multiplex base, after the data sampled at the local information source has been converted into digital signals by an A-D converter in a terminal apparatus provided at or in the vicinity of such information source. However, two major difficulties described below remain to be solved in conjunction with such time division multiplex transmission of digital sampled data:

(1) In the case where the functions of the bus protection relaying system such as described above are to be executed by a digital processor such as a digital computer, different sampling times among the data would require a correcting operation for establishing correct correlation among the sampling times, which implies that a lot of time will be consumed for such correcting operation, whereby indispensable requirements such as a high speed response and a high accuracy for fault detection can not be satisfied. Accordingly, in order to reduce the burden or load imposed on the processor, it is necessary to effect the data samplings at the same time in a whole system.

(2) Since the data transmission lines for transmitting digital data from terminal equipments at information sources to a master station in which digital data processors are installed will extend frequently in the vicinity of conductors where large currents flow, there arises an undesirable possibility of electromagnetic or electrostatic noise being induced in the data transmission line, which of course must be overcome.

SUMMARY OF THE INVENTION

An object of the present invention is to provide a data reading and transmission system suited for use in deriving data from a large number of data sources distributed in a system to be controlled or monitored through simultaneous sampling with the aid of a common optical fiber.

Another object of the present invention is to provide a data reading and transmission system which assures a reliable data collection without being subjected to influence of electromagnetic or electrostatic noise and thus can be used for applications where noise generation is particularly remarkable such as a station yard.

Still another object of the present invention is to provide a terminal equipment which can be used for collecting different types of data only by changing correspondingly only a setting of a part of the construction parts while maintaining a major portion in the same structure and thus can exhibit a high flexibility of use in addition to the ability for mass production.

The data reading and transmission system according to the invention has main features enumerated below:

(1) A synchronizing signal is periodically sent out from a central master station through a first common optical fiber transmission line.

(2) Each terminal equipment is applied with the synchronizing signal derived from the common optical fiber transmission line through a respectively provided optical coupler such as beam splitter.

(3) Each terminal equipment incorporates means which can operate in response to the synchronizing signal to digitize the sampled data and inject into a second common optical fiber through an optical coupler during a time slot allotted to the particular terminal equipment, whereby data is collected periodically from many terminal equipments distributed in the system on a time division base.

(4) Allotment of time slots is required to differ from one to another of each terminal equipment. This can be attained merely by varying the connection of a strap of a time slot selector circuit in each of standardized terminal equipment.

DESCRIPTION OF THE PREFERRED EMBODIMENTS

Figure 1:
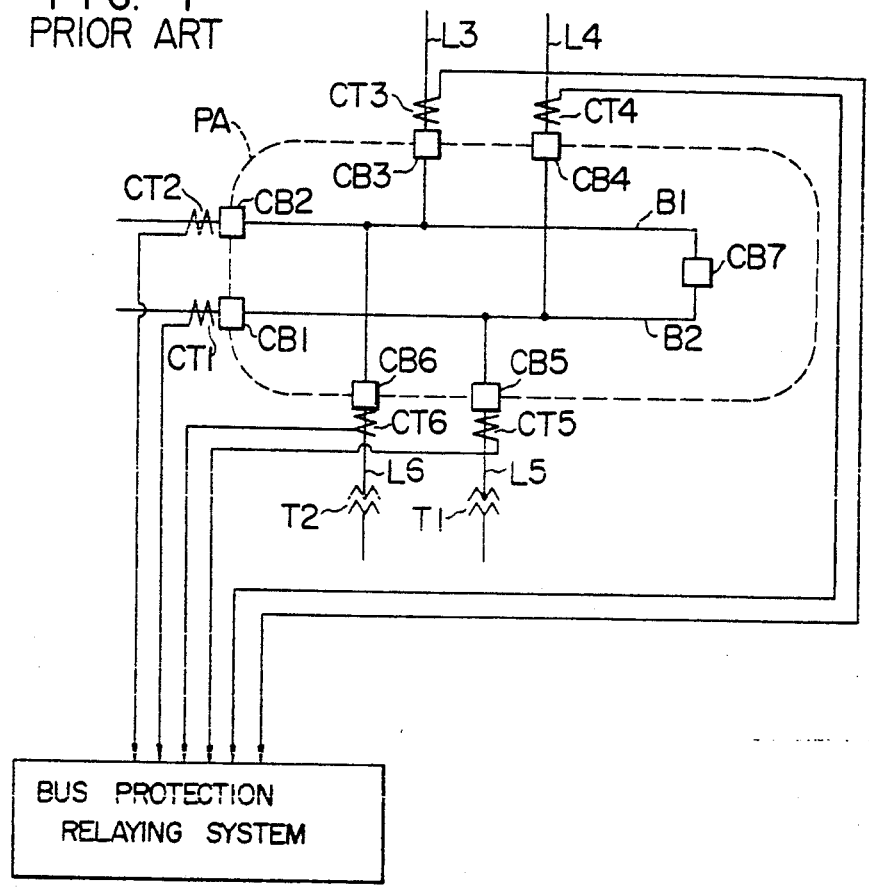
FIG. 1 shows in a schematic circuit diagram a conventional arrangement of a data transmission system adopted in a substation by way of an example of a power system.
Figure 2:
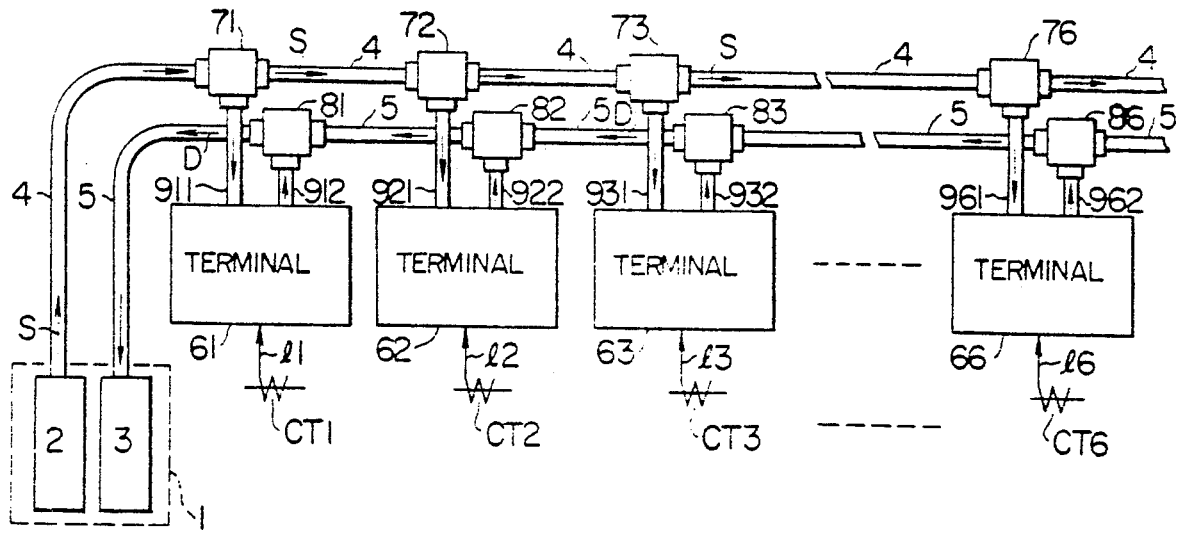
FIG. 2 shows schematically a general arrangement of a data collection system in accordance with an embodiment of the invention.

FIG. 2 shows an exemplary embodiment of the data reading and transmission system according to the invention which is preferably used in a bus protection relay system in an intra-substation. In this figure, reference symbols CT1, CT2, ..., CT6 denote current transformers adapted to constantly produce secondary currents which are proportional to transmission line currents and fed to associated data collection terminal equipments 61, 62, ..., 66 disposed at respective measuring points over signal lines 11, 12, ..., 16, respectively. Arranged adjacent to the bus protection relay system (not shown) is a master station 1 which comprises a transmitter unit 2 for transmitting a synchronizing signal to all the terminal equipments 61 to 66 and a receiver unit 3 for receiving individual data signals D from each terminal equipment. The synchronizing signal S is generated by the transmitter unit 2 with a predetermined period $T_F$ on the basis of criteria described hereinafter and supplied to every terminal equipment for the sake of simplicity located at the measuring points or places through a common optical fiber 4 for transmission. The optical fiber 4 which is commonly shared by all the terminals is laid so as to extend in the vicinity of every one of these terminals 61 to 66. Optical couplers 71, 72, ..., 76 are provided each in association with each of the terminals 61, 62, ..., 66 in the vicinity thereof and serve to direct the synchronizing signals S transmitted through the common optical fiber 4 individually into each associated terminal equipment 61, 62, ..., 66, respectively, by dividing the light power. Such light couplers 71–76 may consist of a conventional optical coupler, tee coupler or star coupler beam splitter or the like. The individual synchronizing signals derived from the common optical fiber 4 through the optical couplers 71 to 76 are then coupled to each associated terminal equipment 61 to 66 through respective optical fibers 911 to 961.

In this manner, each terminal equipment 61 to 66 responds to the synchronizing signal S supplied thereto periodically with a predetermined time interval from the transmitter unit 2 of the master station 1 to sample a current flowing through the associated circuit to be monitored by the terminal equipment. The sampled signal thus obtained is converted to a digital signal which is then fed to a common optical fiber data transmission line 5 during a time slot allotted to that terminal equipment. Reference numerals 912 to 962 denote optical guide fibers adapted to introduce the digital data signals from the terminal equipments into the common optical fiber data transmission line 5 through respective optical couplers 81 to 86. For the optical couplers 81 to 86, any suitable device of conventional type may be employed. Since the time slots to be allotted to the various terminal equipments are set different from one another, no such situation will arise in which the data is transmitted to the master station simultaneously from two or more terminal equipments. Data is fed to the receiver unit 3 at the master station 1 from the individual terminal equipment as multiplexed on a time division base.

A typical exemplary embodiment of the terminal equipments 61 to 66 will be described in detail by referring to FIGS. 3 and 4. It should be noted that these terminal equipments are implemented in a substantially identical arrangement with the only exception that different connections of the straps ST1 are made in the time slot setting portions ST of the terminals serving as selector switch for sending out the respective data during the respectively allotted time slots.

Figure 3:
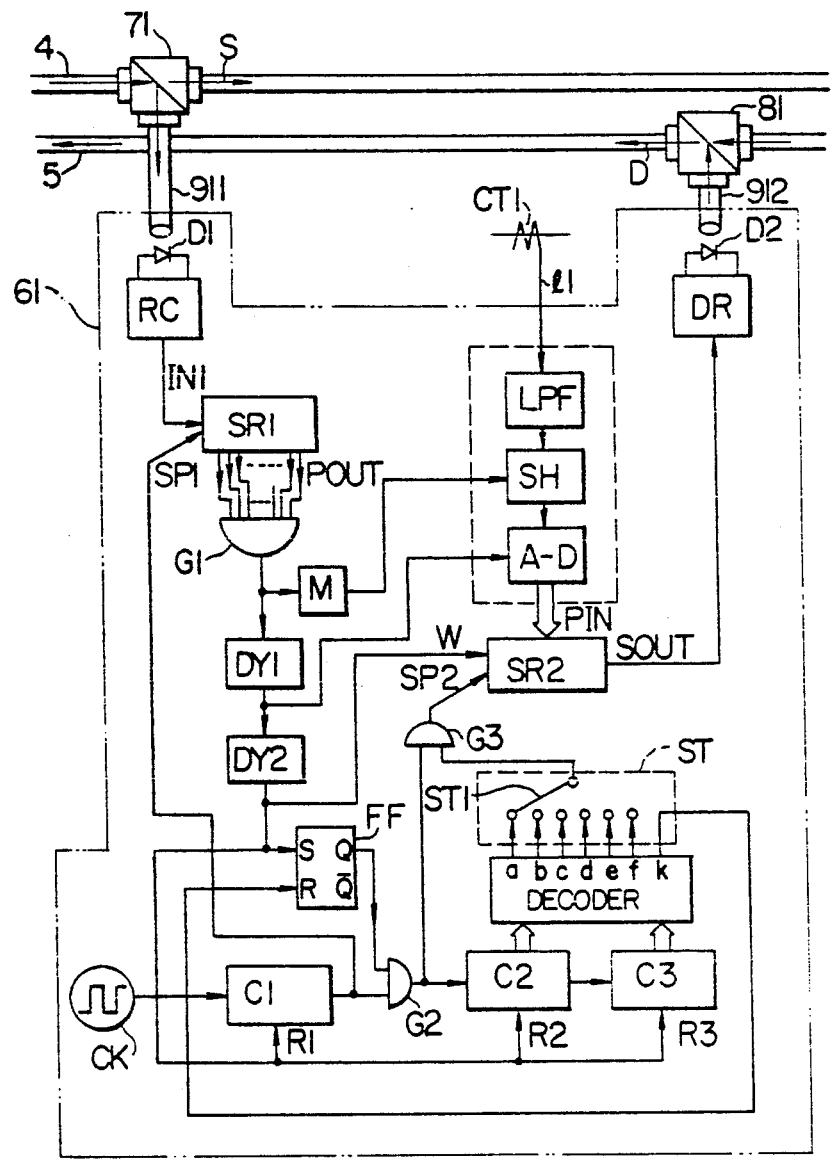
FIG. 3 is a block diagram showing an arrangement of a terminal equipment.

Referring to FIG. 3 which shows a general arrangement of the terminal equipment 61, reference symbol D1 denotes a photo-detector for receiving the synchronizing signal which is derived from the common optical fiber 4 by the optical coupler 71 and fed through the optical fiber guide 911. Such a photo-detector may be composed of a well known pin-type photodiode or APD (avalanche photodiode). Symbol RC denotes an interface device for processing the output signal from the photo-detector D1 so as to be compatible with the operations of succeeding circuits implemented in IC configuration. Such an interface device RC is usually composed of a preamplifier, comparator and so forth as is well known in the art and is generally referred to as an opto-electrical converter in combination with the photo-detector D1.

The output signal from the opto-electrical converter, that is the restored electric synchronizing signal is applied to an input terminal IN1 of a shift register SR1 for receiving the synchronizing signal. The shift register SR1 is driven by a shift pulse SP1 output from the final stage of a counter C1 which is constantly incremented by clock pulses from a clock generator CK. The number of flip-flops constituting all the stages of the shift register SR1 is so selected as to be equal to a total number of bits of the synchronizing signal S coming from the master station 1. The outputs from all the stages of the shift register SR1 are applied to n inputs of an AND gate G1, respectively. Since the period of the shift pulses SP1 is selected at a value equal to a one-bit interval of the synchronizing signal from the master station, the AND-gate G1 produces logic "1" output during a time (a time interval $t_1$ shown in FIG. 4) in which all bits of the synchronizing signal are placed in the shift register, which output signal logic "1" is then applied to a succeeding one-shot multivibrator M and a first delay element DY1. In more particular, the synchronizing signal applied to the input terminal IN1 of the shift register SR1 is stored at each time where the shift pulses SP1 are applied to the shift register SR1. When a predetermined number n of the clock pulses have been stored, the AND gate G1 is enabled to output logic "1". In this manner, even if the timing of clock pulse generated by the clock source CK is not completely synchronous with the received synchronizing signal S, the timing of the output signal of the counter C1 is automatically corrected by the synchronizing signal S, because the counter C1 is reset by the output of the gate G1. Therefore, a clock generator may not be required with high accuracy but with ordinary accuracy. The one-shot multivibrator M produces an output signal of time duration $t_2$ shown in FIG. 4, only when it is triggered by the trailing edge of the output signal from the AND gate G1. The output signal from the one-shot multivibrator. M is applied to a hold command terminal of a sampling and hold circuit SH having an analog signal input terminal which is constantly applied with output signals, as one of line data, from a low-pass filter LPF. To remove an aliasing noise produced in the sampling process, the output signal from the current transformer CT1 is previously passed through the low-pass filter LPF. The line data signal is thus held in the sampling and hold circuit SH only during the duration of the sample-holding command signal input thereto.

On the other hand, the first delay element DY1 is operative to delay the output signal from the AND gate G1 by a time $\tau_1$, the value of which is so selected that the output signal from the sampling and hold circuit SH can be produced when the sampled value in the circuit SH is stabilized. The output from the delay element DY1 is supplied to a second delay element DY2 and at the same time to an analog-to-digital or A-D converter AD as a conversion command signal, which converter AD is now in the position to convert the instantaneous value of the line current as sampled and held in synchronism with the synchronizing signal into a corresponding digital quantity to be produced as the output from AD. The second delay element DY2 exhibits a delay time $\tau_2$. The output signal from the delay element DY2 is utilized to set a flip-flop FF destined for regulating the time interval for transmitting operation of the terminal equipment 61 and additionally used as a write-command signal W of parallel data PIN to a shift register SR2 of a parallel-input and series-output type. The delay time $\tau_2$ of the delay element DY2 is selected longer than the time duration required for the converting operation of the converter AD.

Correspondence in time among the various signals described above are illustrated in FIG. 4 as signal waveforms S, G1, M, DY1 and DY2. In this figure, symbols at the left column represent that the associated waveforms are outputs from the circuit elements designated by those symbols in FIG. 3.

The output from the flip-flop FF for regulating the transmission time interval is applied to the AND gate G2 as a gate enabling signal. Accordingly, so long as the output from FF remains logic "1", the final stage output from the counter C1 serving as a pulse frequency divider for the clock pulses from CK can pass through the AND gate G2. The output pulse from the gate G2 is utilized as the driving pulse for a counter C2 which serves to count the bit number (8 bits in the case of the illustrated embodiment) which is equal to a length of one word of data to be transmitted. The outputs from every stage of the bit counter C2 are supplied to a decoder DEC with the final stage output thereof being used as a drive signal for a terminal number counter C3 having a count capacity equal to the number of terminal equipments. Stage outputs from the counter C3 are applied to the decoder DEC.

It will now be appreciated that the counters C2 and C3 can operate with a predetermined time relation to the synchronizing signal from the master station 1 (i.e. with a time delay $\tau_3$ relative to a received synchronizing word) in view of the fact that the output from the second delay element DY2 is applied to the reset terminals R1, R2 and R3 and that the period of pulse passing through the AND gate G2 is equal to a one-bit length of the received synchronizing signal, as described above. Consequently, the decoder DEC operated in response to the output from these two counters C2 and C3 produce sequentially six distributed pulses from the terminals a, b, c, d, e and f, each pulse having a duration equal to one word length of data to be transmitted, while the output pulse from the terminal k of the decoder DEC is produced when AND-conditions for the final count values from the counters C2 and C3 are satisfied. These pulse signals are shown in FIG. 4 at DE(a), ..., DE(k).

The output signals from the terminals a-f of the decoder DEC serve for selectively regulating the time slot for the data to be transmitted from the associated terminal equipment to the master station 1. For the terminal equipment 61, the strap ST1 of the time slot setting circuit or selector ST is connected to the terminal a of the decoder DEC. For each terminal equipment 62, 63, ..., 66, the strap ST1 is connected to the terminals b, c, ..., f, respectively. The output from the terminal a of the decoder DEC as connected by the strap ST1 is used to enable the AND gate G3. On the other hand, the pulses from the counter C1 passing through the AND gate G2 are supplied as the shift pulses SP2 to the shift register SR2 for data transmission during opening period of the gate G3. As described hereinbefore, the shift register SR2 is loaded with the digital data from the current transformer CT1 as sampled upon reception of the synchronizing signal S. The data stored in the register SR2 is thus shifted by one bit in response to every shift pulse SP2 and an output from the serial output terminal SOUT. The serialized data is fed to an electro-optical converter DR only during a time interval or time slot allotted to the terminal equipment 61. The electro-optical converter DR serves to drive a light emission element D2 for converting the electric signal data edited in the manner described above into a corresponding light signal to be coupled to the common optical fiber data transmission line 5. For the light emission element, LED (light emitting diode), semiconductor laser or the like conventional elements may be used. The light signal produced from the light emission element D2 is fed through the optical fiber guide 912 and hence to the data collecting and transmitting optical fiber 5 through an optical coupler 81.

The above description has been directed to the operations of the terminal equipment 61. However, it will be appreciated that the same will apply to the other terminal equipments except for different selections of the output terminals of the decoder DEC through the strap SP1. For example, in the case of the terminal equipment 65, the strap of the time slot selector ST is connected to the associated terminal e of DEC, whereby the sampled value of system current data or information available from the associated current transformer CT5 is transmitted from the terminal 65 during a time slot allotted thereto by the strap connection.

Figure 4:
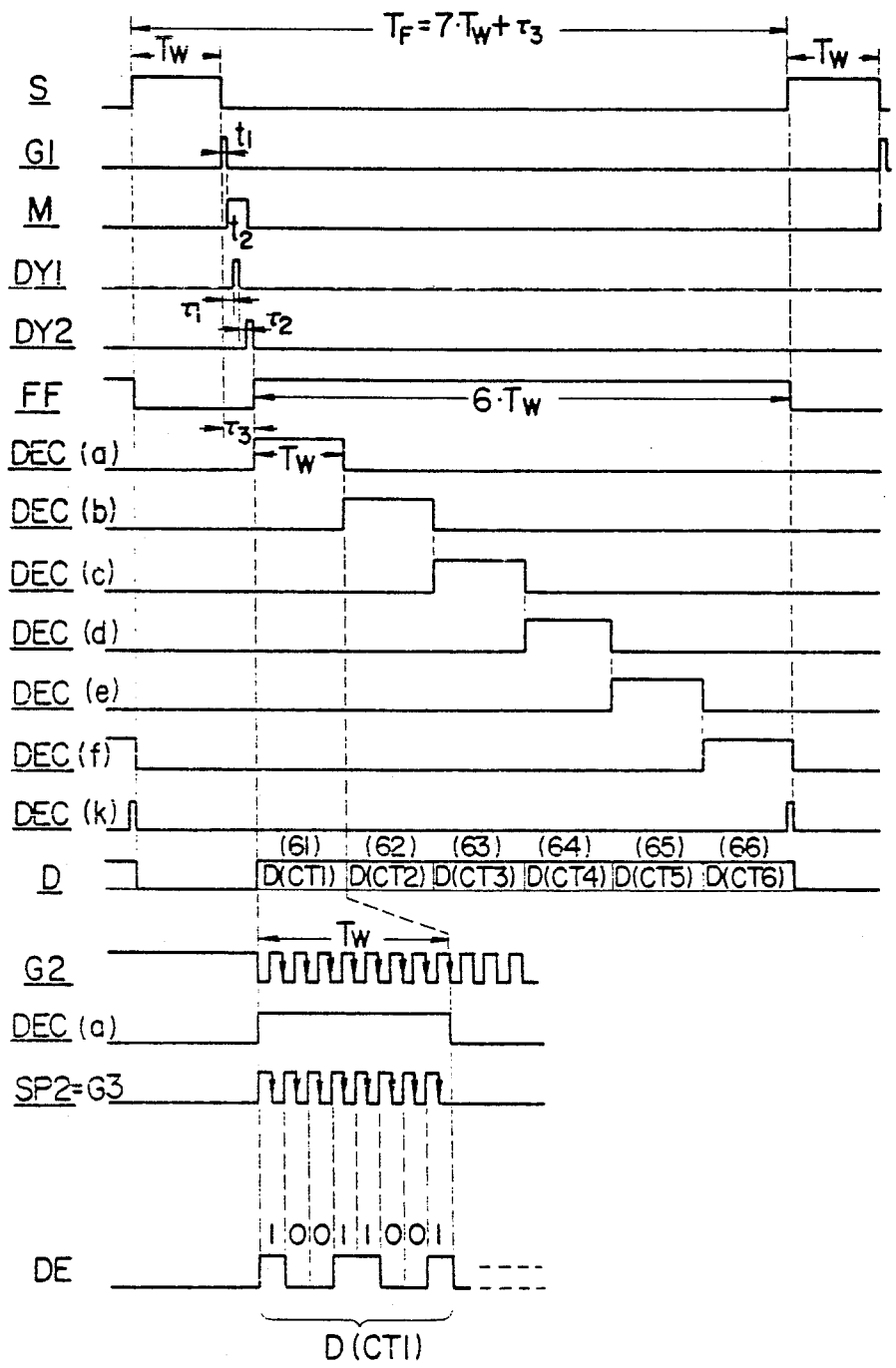
FIG. 4 is a waveform diagram showing various signal waveforms to illustrate operations of the arrangement shown in FIG. 3.

The signal transmitted from the terminal equipment 5 consists of a one-word signal having 8 bits in a form of "10011001", for example, as is shown in FIG. 4 at DE. This signal represents the information of the system current value sensed by the current transformer CT1 at the time point $t_2$. In this manner, the data signals from the current transformers CT1 to CT6 are transmitted from the associated terminal equipments 61 to 66 to the receiver unit 3 through the optical fiber 5 as a sequential train of data signals without being superposed on one another, as indicated by the waveform D in FIG. 4.

As will be appreciated from the foregoing description, in each of the terminal equipments, the system information obtained through sampling in synchronism with the synchronizing signal from the master station 1 is digitized and properly transmitted to the receiver unit 3 of the master station 1 through the common optical fiber data transmission line 5 during the time slot allotted specifically to each of the terminal equipments in a train of collected data signals multiplexed on the time division base. It will be self explanatory that the data as collected by the optical fiber 5 is edited cyclically, since the synchronizing signal S is applied to the optical fiber 4 with a time interval $T_f = 7 T_w + \tau_3$ ($T_w$ is equal to the length of a synchronizing word or length of one data word).

Figure 5:
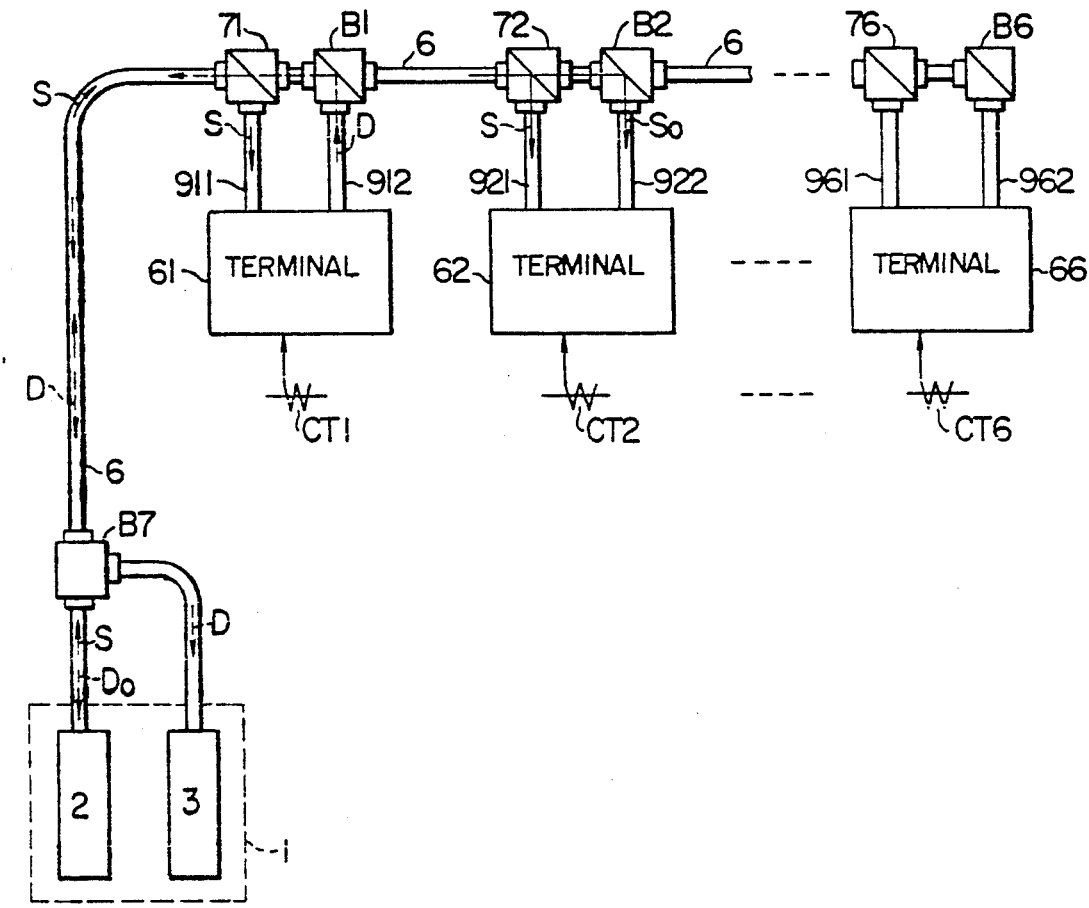
FIG. 5 shows schematically another embodiment of the data collecting system according to the invention.

In the case of the embodiments described above, two optical fibers 4 and 5 are separately employed for transmission of the synchronizing signal S and for transmission of the sampled data signals, respectively. However, it is also possible to implement the data collection system with a single optical fiber use for transmission of both the synchronizing signal and the data signals. FIG. 5 shows an embodiment of the data collection system of this type, in which a single optical fiber 6 is provided with the optical couplers B1, B6 each inserted in series to each of the optical couplers 71, ..., 76 of the same structure as those shown in FIG. 2 and additionally with another optical coupler B7 for separating the optical data signals D to be applied to the receiver unit 3. The synchronizing signal S is introduced to the terminal equipments 61, ..., 66 through respective optical coupler 71, ..., 76 in a similar manner as described hereinbefore in conjunction with FIG. 2. On the other hand, the output data signals from the terminal equipments are fed to the associated optical couplers B1, ..., B6 through the light guides 912, ..., 962 and hence into the optical fiber 6 in the direction toward the receiver unit 3. In the embodiment shown in FIG. 5, there may appear the synchronizing signal $S_O$ which is fed to the terminal equipment 62 through the optical coupler B2, while there may appear a data signal $D_O$ diverted to the transmitter unit 2 through the optical coupler B7, for example. However, these signals would not be sensed with any disturbing influence on the operation of the terminals and the transmitter.

The embodiment shown in FIG. 5 is advantageous from the economic viewpoint over the one shown in FIG. 2, in view of the fact that the quantity of optical fiber as required for the data collecting system shown in FIG. 5 can be reduced to a half of that required for the system of FIG. 2.

Figure 6:
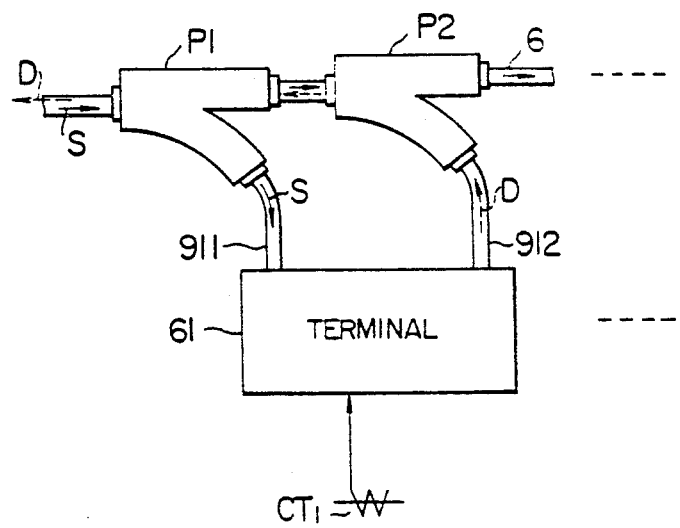
FIG. 6 shows another arrangement of optical couplers used in the system shown in FIG. 5.

FIG. 6 shows a modification of the embodiment shown in FIG. 5, in which optical couplers P1 and P2 of a known type are substituted for the optical coupler 71 and the optical injector B1 with substantially same advantages.

Figure 7:
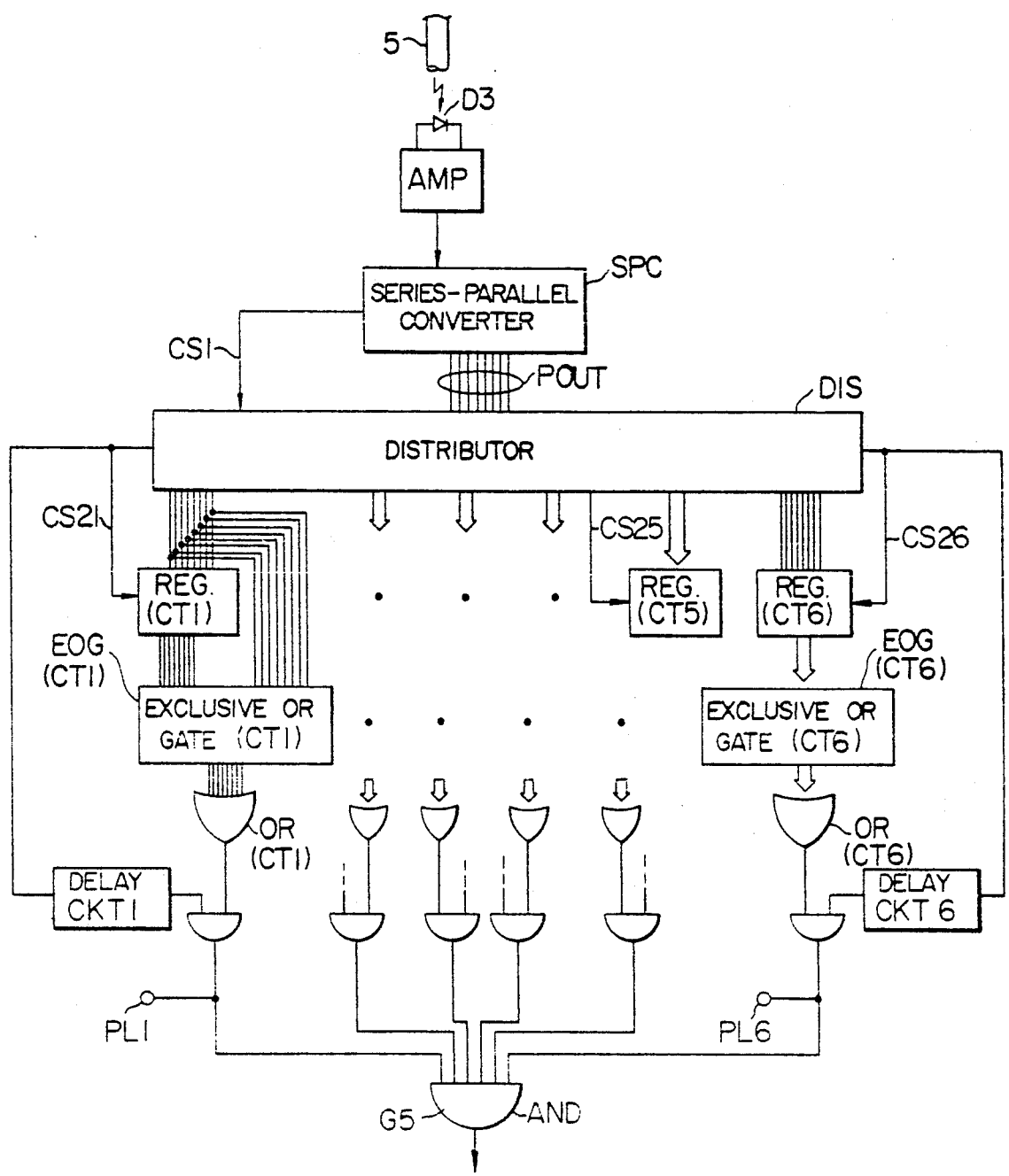
FIG. 7 is a block diagram showing an arrangement of a receiver unit in a master station shown in FIGS. 2 and 5.

FIG. 7 shows in some detail an arrangement of the receiver unit 3 incorporating therein a circuit for checking the reliability of data signals transmitted thereto from the various terminal equipments. The value of line or system information or data as sent from the terminal equipment is usually different for every sampling time point. Accordingly, a succession of data D(CT1) (FIG. 4) of the identical contents coming from the terminal 61, for example, will indicate a malfunction of the current transformer CT1 or failure of the terminal 61. The checking apparatus shown in FIG. 7 functions to compare the data at a given sampling time point with the data obtained at the immediately preceded sampling time point. When no coincidence is found between these two data, the first mentioned data is regarded as to be reliable and transferred to the protective relaying system. On the other hand, upon occurrence of coincidence between the above data, an alarm device may be energized.

A train of system or line information such as shown by the waveform D in FIG. 4 transmitted through the optical fiber 5 is converted into corresponding electric signals by an opto-electric converter element D3 of the receiver unit 3, which electric signals are input to a series-parallel converter circuit SPC (well-known per se) after having been amplified by an amplifier AMP. The circuit SPC produces a parallel output signal POUT of a one word length (8 bits) at every time where each word is received, to a distributor circuit DIS which in turn distributes the input signals to each of registers REG(CT1), ..., REG(CT6) for every one word in a proper sequential order under control of the trigger signal group CS1 from the circuit SPC. Each of the registers REG is adapted to store temporarily only the data from the associated terminal equipment and to up date the stored contents in response to the trigger signal CS21-CS26 from the distributor circuit DIS. Such register may be composed of a known latch circuit. An exclusive OR gate EOR(CT1) functions to compare information of one word stored in the register REG(CT1) with the latest information of one word which is not yet stored in the same register on the bit base, and produce logic "0" output upon occurrence of coincidence and logic "1" output upon incoincidence to an OR gate OR(CT1). Accordingly, the output from OR(CT1) will be logic "1", unless the outputs from the exclusive OR gate EOG(CT1) are logic "0" for all of eight bits. When all the OR gates OR(CT1), ..., OR(CT6) associated with the terminal equipments 61, ..., 66, respectively, produce logic "1's", an AND gate G5 produces logic "1". This means that the data from all the terminal equipments are normal, whereby the contents in the registers REG(CT1) to REG(CT6) are allowed to be transferred to the protective relaying equipment.

On the other hand, when logic "0" is produced from any one of the OR gates OR(CT1) to OR(CT6), the output from AND will be logic "0", which may be utilized to produce an alarm signal indicating that a malfunction or failure occurs at least in one of the terminal equipments. Under the circumstance, it is possible to identify the abnormal terminal equipments, if any, with the aid of pilot lamps PL1, ..., PL6 connected to the OR gates OR(CT1), ..., OR(CT6), respectively.

In the foregoing description, it has been assumed that the invention is applied to data collection systems for protection of a power system. However, the invention is never restricted to such application. It is apparent that the invention can be applied to general data transmission systems for collecting cyclically data sampled simultaneously at many distributed data sources through a common optical fiber.

The invention provides the following advantages.

(1) A reliable data collection can be accomplished without suffering from any electromagnetic or electrostatic noise, whereby the data correction system can be adopted in a noise producing environment such as a substation.

(2) The terminal equipment can be manufactured as a standardized unit.

(3) A high flexibility of use can be attained so that expansion of a power system, for example, may be easily realized with the number of terminal equipments being correspondingly increased.

(4) Data collection can be carried out with an improved efficiency.

(5) A high quality or accuracy is not required for the clock generator used in each of the terminal equipments, since the timing of such clock generator can be corrected by the synchronizing signal from the master station.

We claim:

1. A system for reading and transmitting data from a plurality of remote terminal equipments installed at respective measuring locations distributed in a system to be controlled in protection and control operations through simultaneous sampling, comprising at least one optical fiber, means for generating a synchronizing signal to be transmitted through said optical fiber to each of said terminal equipments and means for receiving data at said measuring locations from each of said terminal equipments through said optical fiber, wherein each of said terminal equipments comprises:

first means for receiving said synchronizing signal to initiate measurement of a quantity to be measured at the associated measuring location in synchronism with said synchronizing signal;

second means for sampling the measured quantity and converting an analog data corresponding to the sampled quantity into corresponding digital data; and third means for sending out said digital data output from said second means to said receiving means through said optical fiber during a time slot specifically allotted to said terminal equipment, discriminately from other time slots each being allotted specifically to each of the other terminal equipments.

2. A data reading and transmission system as set forth in claim 1, wherein said first means includes a light optical coupler optically coupled to said optical fiber for introducing said synchronizing signal into the associated terminal equipment, means for converting said synchronizing signal introduced in the form of a light signal at a predetermined time interval through said optical fiber into a corresponding electric synchronizing signal, and means for producing a trigger signal to said second means thereby to initiate measurement of the quantity to be measured.

3. A data reading and transmission system as set forth in claim 1, wherein said second means includes means for receiving a trigger signal from said first means to sample said measured quantity at the time point when said trigger signal is received, and analog-to-digital conversion means for converting analog output from said sampling means into a corresponding digital quantity.

4. A data reading and transmission system as set forth in claim 1, wherein said third means includes a shift register for storing therein output signals from said second means, means for producing said output signals from said second means as serial data signals during said specifically allotted time slot, means for converting said serial data signals into corresponding light signals, and means for injecting said light signal output from said converting means into said optical fiber.

5. A data reading and transmission system as set forth in claim 1, wherein said optical fiber means is composed of a synchronizing signal transmission of only an optical fiber for supplying light synchronizing signal from said synchronizing generating means to each of said terminal equipments, and a data signal transmission of only an optical fiber for transmitting light signal data representing the measurement data from said third means to said receiving means.

6. A data reading and transmission system as set forth in claim 1, wherein said optical fiber means includes a single optical fiber adapted for transmitting both of light synchronizing signal from said synchronizing signal generating means and light signal data representing the measurement data from said third means.

7. A data reading and transmission system as set forth in claim 1, wherein said means for receiving data derived from said measurement locations includes means for converting received light signal data into corresponding electric signal data, series-parallel coverter means for converting serial signals output from said converting means into parallel signals, distributor means for distributing output signal from said serial-parallel signal converter means to registers each associated with each of said terminal equipments on a word base, an exclusive OR gate for comparing the output data from said distributor with data stored in said registers on a bit base, and an OR gate connected to the output of said exclusive OR gate.

8. A data reading and transmission system as set forth in claim 1, wherein said terminal equipments are of substantially the same construction except for the connected position of the strap for selectively setting time slots specifically allotted to each of said terminal equipments.

* * * * *